June 23, 1970  J. GACHOT  3,516,688
MULTIPLE-PURPOSE DEMOUNTABLE PIPE-COUPLING SYSTEM
Filed April 20, 1967  4 Sheets-Sheet 2
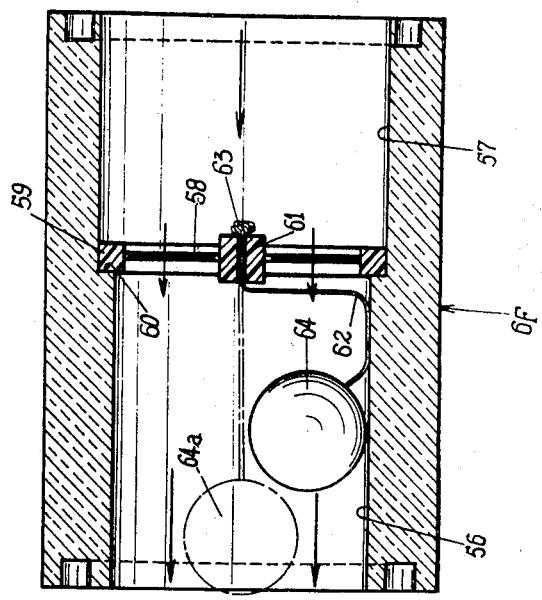
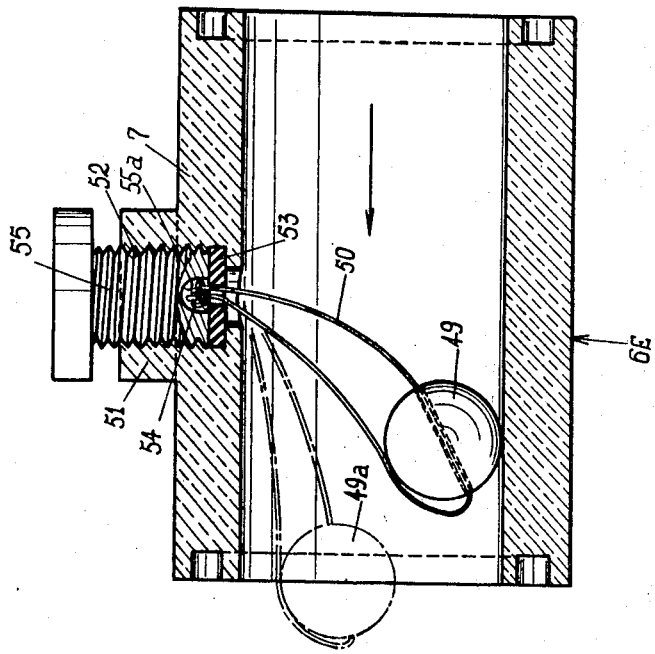
INVENTOR
JEAN GACHOT
BY Young + Thompson
ATTYS.

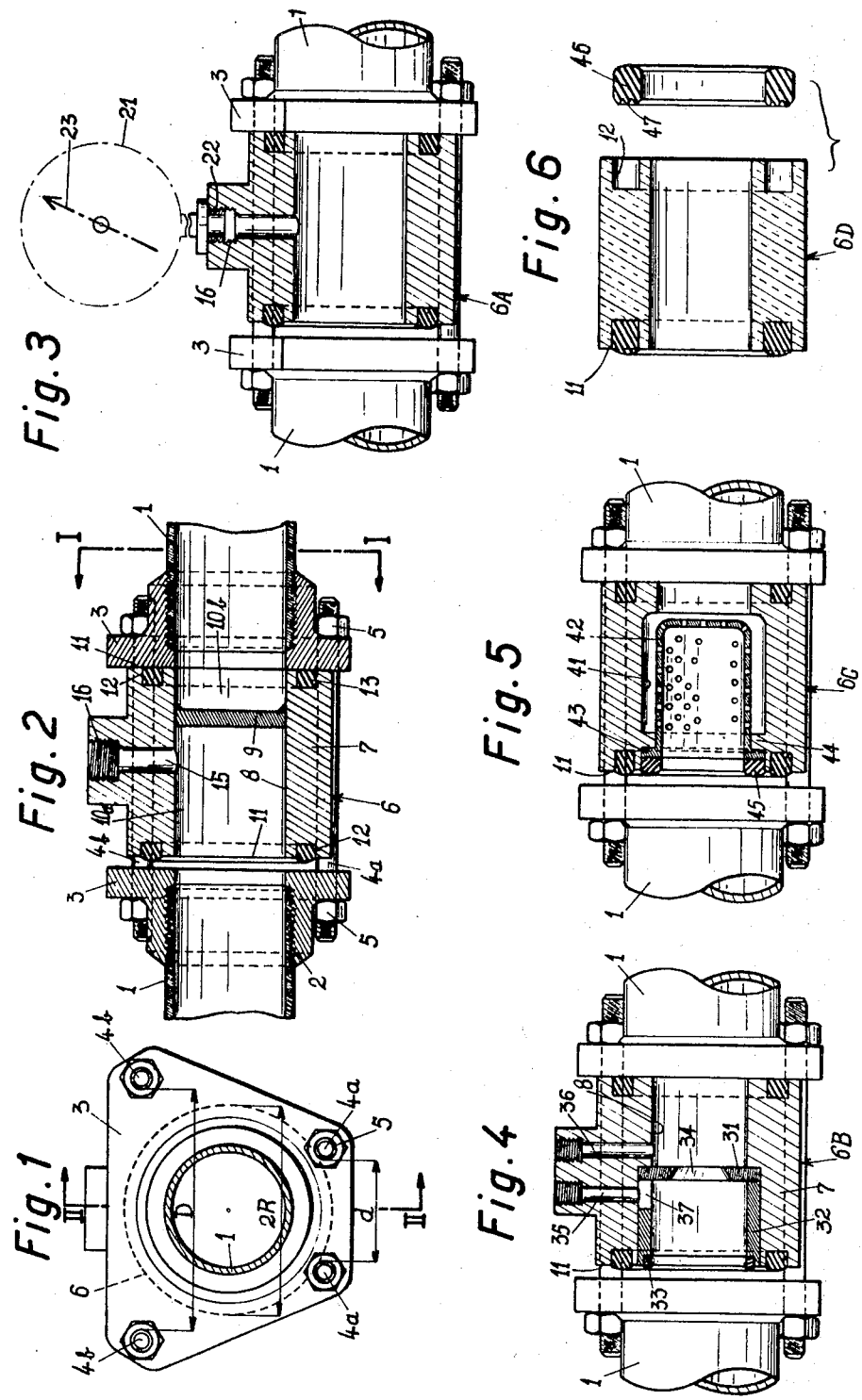

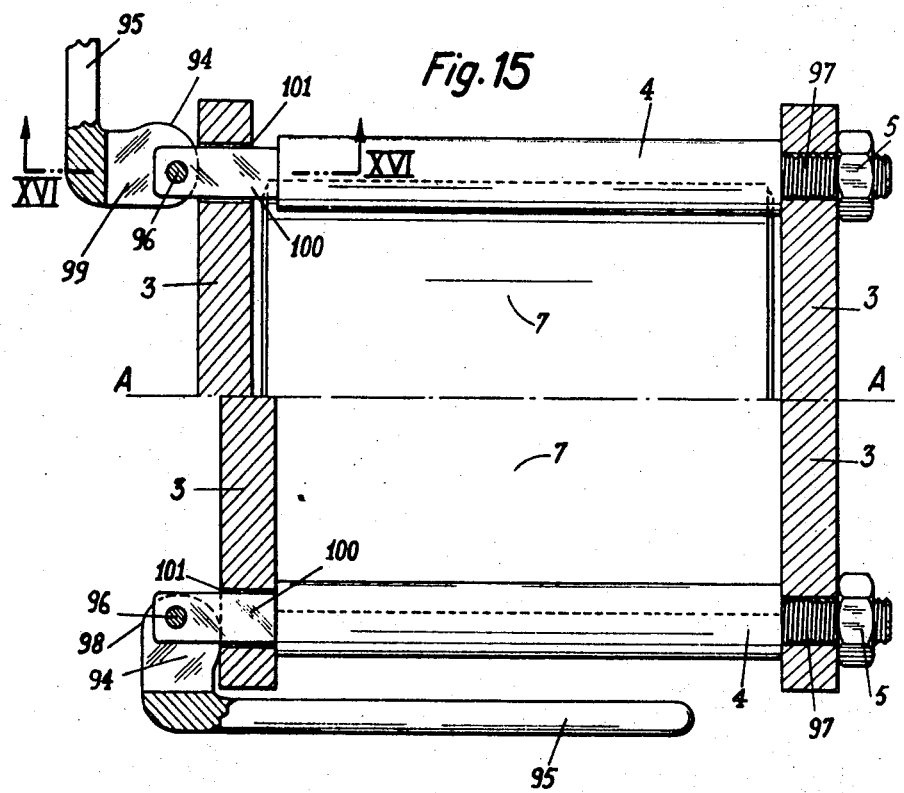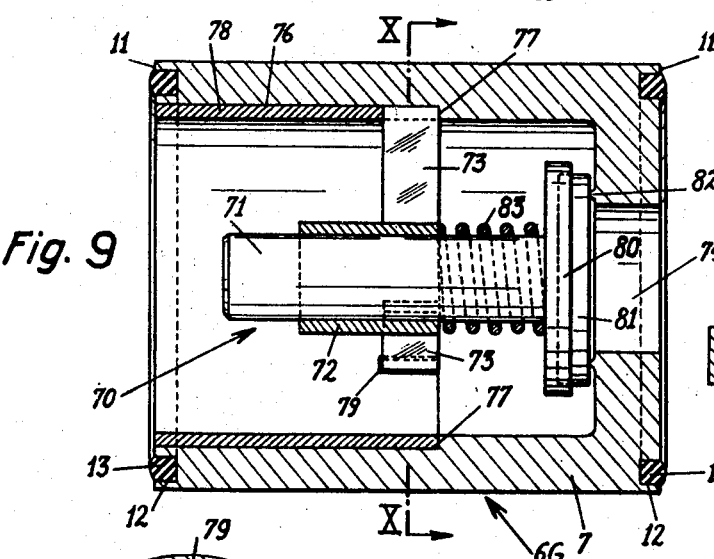

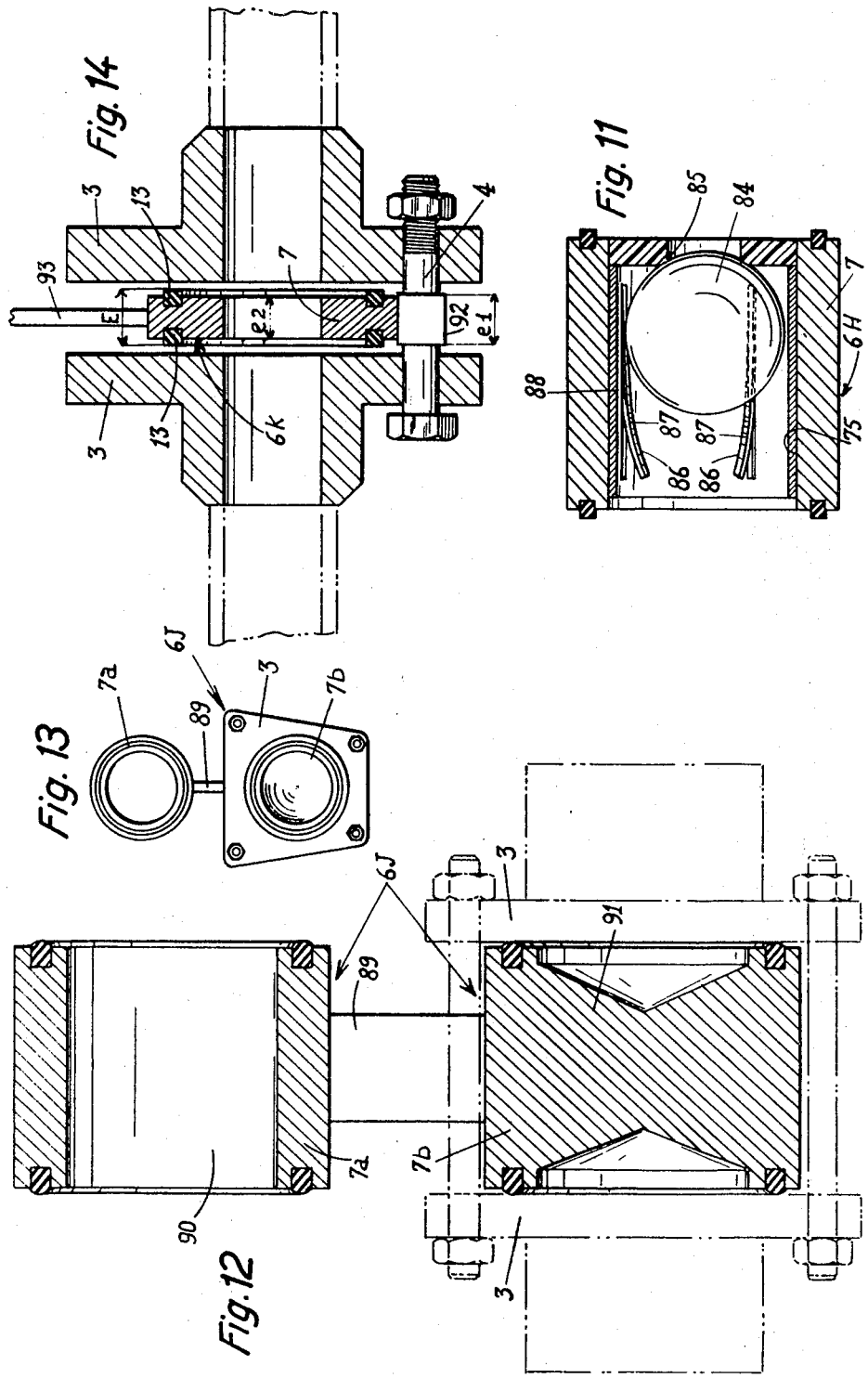

United States Patent Office 3,516,688
Patented June 23, 1970

3,516,688
MULTIPLE-PURPOSE DEMOUNTABLE PIPE-COUPLING SYSTEM
Jean Gachot, 179 Avenue de la Division Leclerc, Enghien, France
Filed Apr. 20, 1967, Ser. No. 632,377
Claims priority, application France, Apr. 28, 1966, 59,486; Sept. 9, 1966, 75,823
Int. Cl. F16l 23/00
U.S. Cl. 285—31                                  1 Claim

ABSTRACT OF THE DISCLOSURE

A multiple-purpose pipe-coupling system which is both demountable and convertible for the purpose of joining two elements of a same pipe comprising two oppositely-facing terminal coupling flanges connected by tie-bolts spaced about the axis of the pipe. The pipe-coupling system comprises a tubular coupling unit which is removably inserted and clamped between the two pipe-flanges while bearing longitudinally on two adjacent tie-bolts of an assembly of similar tie-bolts which are spaced around the coupling unit but do not traverse this latter. The coupling unit forms part of a set of interchangeable couplings having grooved end faces in which annular seals are fitted so as to project from the end faces to a slight extent in the rest position. The couplings of a same set are provided with different internal elements so as to constitute different equipment units which can be indifferently interchanged by positioning between the pipe-flanges and keying on the tie-bolts which serve to connect the pipe-flanges.

---

This invention relates to a pipe-coupling system. The aim of said system is to provide a mechanical coupling between two consecutive elements of a pipe. However, the primary object of the system is to provide means whereby an apparatus which performs a predetermined function can be removably mounted on a pipe and whereby such an apparatus can be rapidly replaced by an apparatus of any other type for the purpose of performing a different function, the demounting operations thereby entailed being as short and simple as possible.

The term "apparatus" as employed in this description must be taken in its widest sense as will be seen hereinafter. However, globe cocks will be considered as excluded from the scope of this invention.

It frequently proves necessary in the case of industrial pipes and ducts to insert apparatuses such as gates or indicators which show the direction of flow of fluids, or measuring instruments. Another common requirement consists in effecting the temporary filtration of fluid which circulates through the pipe. At the present time, the installation of apparatus of the type mentioned is fairly complicated, especially in the event of replacement of one apparatus by another inasmuch as this calls for adaptation of piping. As a consequence, assembly and disassembly operations are time-consuming, tedious and costly.

The coupling system which is contemplated by the invention is intended to overcome these disadvantages.

Accordingly, said system comprises two oppositely-facing flanges carried by the two pipe elements and coupled by means of tie-bolts spaced about the axis of the pipe.

In accordance with the invention, said pipe-coupling system is characterized in that it comprises a tubular coupling removably inserted between the two pipe-flanges and clamped therebetween while bearing longitudinally on two adjacent tie-bolts, the assembly of tie-bolts being spaced around said coupling without passing therethrough, said coupling being part of a set of interchangeable couplings in the end faces of which are fitted annular seals which are adapted to project to a slight extent from said end faces in the rest position, the couplings of a same set being provided with different internal elements so as to constitute different apparatuses which can be indifferently substituted for each other by being positioned between the pipe-flanges and keyed on some of the tie-bolts which serve to couple said pipe-flanges.

The coupling system which is contemplated by this invention thus makes it possible to insert in a pipe and to replace both very simply and very rapidly the different couplings which form part of the set and which preferably have a very wide range of different structures.

The invention also makes it possible to provide a coupling system which can be converted at will in a very short time without breaking the mechanical continuity of the piping.

It should preferably be ensured that the relative spacing of two tie-bolts located opposite to those which serve as supports for the coupling is greater than the width of said coupling. Thus, the different couplings of the set can be either fitted or removed by slackening-off the tie-bolt clamping nuts but without removing these latter.

The set of couplings usefully comprises at least two couplings having the following different structures:

The coupling body, or so-called shell, is divided into two non-communicating chambers by means of a sealing partition wall, thereby permitting absolute separation between the two pipe elements.

The coupling shell is pierced by a radial duct which makes it possible in particular to mount therein a measuring instrument such as a manometer or thermometer. In one particular embodiment, said shell contains a diaphragm which forms a constriction in the pipe and is pierced by two ducts which have their openings respectively on the upstream side and downstream side of the diaphragm. These ducts constitute branch points for the connection of a differential manometer.

The coupling shell contains a removable filter element.

The coupling shell is formed of a translucent or transparent material and serves as an inspection window. In this case, the shell can contain a ball attached to a tie so as to permit visual checking of the fluid flow.

The coupling shell contains a non-return valve which permits the flow of fluid in one direction only. In particular, the non-return valve comprises a gate fitted with a seal and carried by a slidably mounted stem, or said non-return valve can alternatively comprise a ball which is axially displaceable between a seating and a stop.

In another embodiment, the coupling comprises two shells which have different internal structures and which are secured to each other by means of a transverse coupling rod.

According to yet another feature of the invention, at least one of the tie-bolts which serve to clamp the oppositely-facing pipe-flanges is fitted with a quick-clamping manual control system such as an eccentric-profile cam provided with an operating lever.

In the accompanying drawings, which are given by way of non-limitative example,

FIG. 1 is a transverse sectional view taken along the line I—I of FIG. 2 and showing a pipe element fitted with a coupling in accordance with the invention;

FIG. 2 is a longitudinal sectional view taken along the line II—II of FIG. 1 and showing the coupling between two portions of pipe elements;

FIG. 3 is a longitudinal sectional view of the coupling, in which the pipe elements are not shown in cross-section, the front tie-bolts being assumed to have been removed and the left-hand flange being shown in the slackened-off position;

FIG. 4 is a similar longitudinal sectional view of another version of the coupling;

FIG. 5 is a similar view of a new form of construction of the coupling;

FIG. 6 is a view of a transparent tubular coupling which is shown separately, one of the seals being assumed to have been removed;

FIG. 7 is a longitudinal sectional view of a transparent tubular coupling containing a fluid flow indicator;

FIG. 8 is a similar view of a comparable type of coupling which is fitted with another type of indicator;

FIG. 9 is an axial sectional view of a tubular coupling fitted with a non-return gate valve;

FIG. 10 is a sectional view on a smaller scale and taken along the line X—X of FIG. 9;

FIG. 11 is an axial sectional view on a different scale and showing a coupling fitted with a non-return ball valve;

FIG. 12 is an axial sectional view of a coupling comprising two interchangeable bodies or shells having different structures;

FIG. 13 is a view on a smaller scale showing the coupling of FIG. 12 which is mounted between the pipe-flanges;

FIG. 14 is a view on a different scale and in axial cross-section showing a coupling which is mounted between the pipe-flanges and corresponding to an alternative embodiment both of the coupling and of the tie-bolts;

FIG. 15 is a view in side elevation and in partial cross-section showing a tubular coupling comprising a quick-clamping system, the coupling shell being shown in the slackened-off position in the top half of the figure and in the tightened position in the bottom half of the figure;

FIG. 16 is a partial sectional view taken along the line XVI—XVI of FIG. 15.

Referring now to FIGS. 1 and 2 of the accompanying drawings, there can be seen at 1 the two elements of a same pipe or duct between which is mounted the coupling system according to the invention. This system comprises in the first place pipe-flanges 3 of substantially trapezoidal shape in the example under consideration, said flanges being secured by means of threaded portions 2 formed on the pipe elements 1. The flanges 3 are mounted in oppositely-facing relation and clamped together by means of longitudinal tie-bolts which, in the example described, comprise a pair of lower tie-bolts 4a and a pair of upper tie-bolts 4b. The threaded ends of said tie-bolts are intended to receive nuts 5. A coupling 6 is removably fitted between the two pipe-flanges 3. Said coupling forms part of the coupling system and is also a constituent element of a set of couplings, all of which have compatible dimensions but which are of different internal structure.

The internal spacing d of the tie-bolts 4a is smaller than the diameter 2R which corresponds to the maximum width of the coupling shell 7 whilst the relative spacing D of the tie-bolts 4b is greater than the diameter 2R.

In addition, the components are so dimensioned that, in the rest position, that is to say when the tubular shell 7 of the coupling 6 is applied tangentially against the tie-bolts 4a, the passageway 8 of the shell 7 is in central alignment with the pipe elements 1.

In the particular example shown in FIG. 2, the coupling shell 7 is pierced by an axial passageway 8 in which is secured either by welding, bonding or any other suitable means a partition wall 9 which separates the passageway 8 into two independent fluid-tight compartments.

The shell 7 is provided on its end faces 11 with annular channels 12 in which are fitted flexible and compressible seals 13 of an annular type having a bulged outer surface. The respective dimensions of the channels 12 and of the seals 13 are such that, in the rest position, said seals project to a very slight extent with respect to the end faces 11. For example, the distance of projection can be between 1 and 2 millimeters at the point of maximum yield relatively to the face 11. In addition, a radial duct 15 which terminates in an internally-threaded aperture 16 is adapted to open into one of the chambers such as the chamber 10a.

In this embodiment, the partition wall 9 is intended to provide an absolute separation between the two pipe elements 1. The radial duct 15 and the internally-threaded aperture 16 are intended to permit the removable mounting of a measuring instrument such as a thermometer or manometer or alternatively a by-pass pipe which can be connected to the aperture 16. Finally, provision can simply be made for the fitting of a threaded plug which is screwed into said aperture, thereby effecting the leak-tight closure of the coupling shell 7.

It is apparent that, once the nuts 5 are slackened off and the pipe-flanges 3 are separated to a slight extent as shown in FIG. 2 in the case of the left-hand flange, it is possible by reason of the spacing D of the tie-bolts 4b either to insert or withdraw the coupling 6 at will. If the pipe is horizontal as in the case of the example shown in the figure, it is not even necessary to ensure that the pipe-flanges 3 are clamped together in order to hold the coupling 6 in position. Said coupling is simply placed on the tie-bolts 4a and is directly supported on these latter.

The design structure therefore makes it possible both to fit the coupling in position and to remove it with great ease. The operations can be performed without entailing the removal of any tie-bolts. In order to ensure fluid-tightness, it is merely necessary to screw up the nuts 5, thereby closing the pipe-flanges 3 which compress the seals 13 until the flanges are practically applied against the end faces 11 of the coupling shell 7.

The set of couplings 6 is preferably designed to cover the most varied functions as will become apparent hereinafter. Nevertheless, said couplings are all interchangeable without entailing the need to disassemble either tie-bolts or pipe-flanges.

In the embodiment of FIG. 3, the coupling 6A which is fitted in position performs the usual function of a tubular coupling member between the two pipe elements so as to permit the circulation of fluid, the partition wall 9 being dispensed with in this example. On the other hand, said coupling is provided within the internally-threaded aperture 16 with the threaded fitting 22 of the measuring instrument 21, the pointer of which is shown diagrammatically at 23. The instrument 21 can be, for example, a thermometer, a manometer or any other measuring instrument which is in relation with the fluid as this latter circulates in the pipe.

The set of couplings should preferably include a coupling such as the unit shown at 6B in FIG. 4 and which permits the assembly of a differential manometer (not shown in the drawings). In this case, the shell 7 of the coupling 6B is provided within its internal passageway 8 with a diaphragm 31 held in position by a ring 32 fitted with a flexible seal 33 which is adapted to project to a slight extent from the end face 11 of the coupling shell. The diaphragm 31 is pierced by a hole 34 which has a smaller cross-section than the passageway 8. There are formed in the shell 7 two radial ducts 35, 36 which have their openings respectively on the upstream side and downstream side of the diaphragm 31. In order to establish a communication between the duct 35 and said passageway, the ring 32 is pierced by an opening 37. There can be mounted in the internally-threaded end portions of the ducts 35, 36 pipe connectors which terminate respectively at the high and low pressure inlets of the differential manometer.

A third type of coupling 6C which is shown in FIG. 5 is recessed so as to form an internal chamber 41, a filter element 42 being fitted within said chamber and removably mounted in said coupling. To this end, said filter element is provided with a peripheral flange 43 which is supported on an internal annular shoulder 44 of the coupling 6C. The flange 43 is fitted with a seal 45 which is adapted to project from the terminal face of the coupling so that, when said seal is compressed by the pipe-flange 3 which is located in oppositely-facing relation thereto, said flange 43 has the effect of rigidly maintaining the filter element 42.

In addition, couplings of very different types can be placed between the two pipe-flanges 3.

A fourth type of coupling 6D which is shown in FIG. 6 is fabricated of transparent material such as Pyrex glass, for example. The cylindrical structure of this coupling is the same as in the previous embodiment. In particular, seals 46 each having convex outer face are fitted in the annular channels 12. The inner face of each seal which is intended to bear on the bottom of the channel 12 is provided with a set of splines 47. When the seal is compressed within the channel 12, its convex face projects slightly with respect to the terminal face 11 of the coupling but the compressed splines 47 provide the seals 46 with a higher degree of elasticity, thereby preventing the build-up of pressures which would otherwise be liable to result in rupture of the channel 12.

The coupling 6D permits visual inspection of the flow of fluid within the coupling or the appearance of the fluid.

In the event that the fluid contained in the pipe is completely transparent or else when it consists of a gas or vapor, and if it is nevertheless desired to determine the conditions of flow of said fluid, a coupling of the type shown in FIGS. 7 or 8 should be employed.

In the embodiment of FIG. 7, the coupling 6E is made of glass or of a transparent plastic material which cannot be attacked by the fluid circulating in the pipe.

In order to check the existence of fluid motion within the pipe, provision is made for a ball 49 which is placed inside the coupling 6E, said ball being formed, for example, of plastic material and traversed by a flexible tie 50. These components are preferably made of a material which affords resistance to acids such as, for example, polytetrafluoroethylene. The coupling shell 7 is provided with a projecting portion 51 in which is formed an internally threaded bore 52. There is placed at the bottom of said bore a washer 53 which is pierced by a hole so as to provide a passageway for two lengths of the tie 50. Said tie terminates in a knot 54 and the complete assembly is capped by a screw 55 provided with an internal recess 55a for the purpose of accommodating the knot 54. The screw performs the function of a packing-gland with the washer 53. When there is no circulation of fluid, the ball 49 is motionless within the passageway 8. When the fluid is in motion, the ball is displaced in the direction of flow. The flow motion of a fluid can thus be readily checked and controlled. It will be understood that the density of the ball 49 must be adapted to conform to the nature, density and velocity of the fluid which passes through the coupling: said density will be slightly greater and the diameter will be smaller in the case of a liquid than in the case of a gas.

When the direction of flow of the fluid is known beforehand, the coupling 6E is advantageously replaced by the coupling 6F of FIG. 8. This type of coupling is provided with an internal passageway having two portions 56, 57 of slightly different diameter. A spider 58 is forcibly engaged within the portion 57 which has the larger diameter. The spider 58 has a circular rim 59 and said rim is abuttingly applied against the annular shoulder 60 which is formed between the passageway sections 56 and 57. The hub 51 of the spider serves for the attachment of a tie 62 which terminates at one end in a knot 63 and at the other end in a ball 64 which is made, for example, of polytetrafluoroethylene.

Should a flow be established, the ball 64 takes up a position 64a at the center of the pipe.

The set of couplings additionally comprises a unit of the type designated as 6G in FIGS. 9 and 10 and containing a non-return gate-valve. The valve 70 comprises a stem 71 and disc or gate 80 on which is fixed a seal 81. The stem 71 is adapted to slide within a sleeve 72 carried by three radial arms 73 of small thickness which bear on an annular shoulder 77 of the coupling shell 7. The arms 73 are applied against the passageway 76 of the shell 7 and keyed by means of a ring 78 which is inserted in the passageway 76 and which is provided for this purpose at the end adjacent to the annular shoulder 77 with three slots 79 in which the ends of the arms 73 are fitted.

When the coupling 6 is clamped between the pipe-flanges in the utilization position, the ring 78 and the arms 73 are locked within their respective recesses and the sleeve 72 is securely held in position.

A spring 83 which is applied at one end against the sleeve 72 and at the other end against the valve-gate 80 tends to apply the seal 81 against a raised annular seat 82 formed at the periphery of an orifice 74 which communicates with the pipe 1 (not shown) once the coupling 6G is placed in position between the pipe-flanges 3.

The coupling 6G is very easy to assemble and allows fluid to pass through only in one direction.

If use is made of a calibrated spring 83, it is thus possible to provide a calibrated valve. By virtue of the ease with which the coupling and valve can be removed, the spring can very readily be changed for the purpose of modifying the calibration of the valve, should this be found desirable.

In the alternative form of FIG. 11, the non-return valve of the coupling 6H comprises a ball 84 which is axially movable between an annular seat 85 formed in the bore 75 of the shell 7 in the vicinity of one of its extremities and a stop 86. The seat 85 is constituted, for example, by a ring formed of polytetrafluoroethylene. In the example described, the stop 86 is formed by means of longitudinal strips 87 which are cut in a ring 88, said ring being inserted within the bore 75. The strips 87 are curved back inwards from the shell 7 at the free ends thereof, with the result that the tips of said strips are inscribed in a circle having a diameter which is appreciably smaller than the diameter of the ball. The adjustment of the strips 87 makes it possible to center the ball on its seat.

The set of couplings advantageously comprises in addition double couplings such as the unit 6J which is shown in FIGS. 12 and 13. This coupling consists of two separate and interchangeable shells 7a and 7b having different structures and rigidly fixed to each other by means of a coupling rod 89. In the example which is illustrated, the coupling shell 7a is provided with a passageway 90 for the flow of fluid and the shell 7b comprises a sealing diaphragm 91. Thus, either one or the other of the shells 7a or 7b can be put into service at will between the pipe-flanges 3. The structure of the unit which is in service can readily be distinguished since the other unit is visible outside the pipe-flanges.

It is apparent that the internal structures of the coupling shells 7a and 7b can be different from those which are contemplated hereinabove, so that each shell can have any one of the structures described in the foregoing.

According to a further improvement shown in FIG. 14, the clamping tie-bolts 4 of the shell 7 of the coupling 6 each have a boss 92, the length $e_1$ of which is slightly greater than the thickness $e_2$ of the coupling shell 7, and slightly smaller than the distance E between the summits of the seals 13 of the shell 7 when said seals are in the rest position.

It can readily be visualized that, when the tie-bolts 4 are tightened hard up, the bosses 92 which are located at a suitable distance on the tie-bolts 3 form abutments which limit the extent of closure of the pipe-flanges 3 and therefore also limit the degree of compression of the seals 13 which are fitted between the coupling shell 7 and pipe-flanges 3.

In the example which is illustrated, the coupling 6K consists of a shell 7 which is of small thickness and simply constitutes a sealing member between the pipe-flanges 3.

According to a further improvement, the shell 7 of the coupling 6K is fitted with an operating rod 93 which extends beyond the edges of the flanges and the free extremity of which can be adapted to constitute a handle or hook (not shown in the drawings) in order to facilitate handling operations.

This device is advantageous when the couplings are of small thickness and when they would therefore be difficult to handle.

According to yet another improvement, the coupling system is so arranged that, at the end remote from the threaded portions 97, the tie-bolts comprise a rapid-clamping system of the manually operated type. This system comprises in the example described a cam 94 having a rounded contour which is applied against the opposite face of the corresponding pipe-flange, as shown in FIG. 15.

The cam 94 is provided with a central recess 99 in which is housed the flattened end 100 of the tie-bolt 4, the coupling between the members 94 and 100 being ensured by means of a pivot-pin 96 which is placed in the eccentric position relative to the rounded edge 98 of the cam 94. The thinned end 100 traverses the pipe-flange through a hole 101 which is formed for this purpose and which permits the positioning or withdrawal of the tie-bolt 4.

The cam 94 is integral with an elbowed lever 95 which constitutes an operating handle. The cam 94 and elbowed lever 95 are so arranged that, when the handle of the lever 95 is parallel to the axis A—A, the pivot-pin 96 is located at a maximum distance from the point of contact between the cam 94 and the pipe-flange 3 (position of maximum clamping as shown at the bottom of FIG. 15).

Conversely, when the handle of the operating lever 95 is placed at right angles to the axis A—A, the distance between the pivot-pin 96 and the edge of the eccentric 94 is of minimum value (released position shown at the top of FIG. 15).

It is apparent that, under these conditions, by lifting the levers 95, the pipe-flanges 3 are released whereas, by lowering said levers, the flanges are maintained forcibly applied against the coupling shell 7. In addition, the clamping pressure can be regulated by applying a greater or lesser pressure on the levers 95. When the handles are parallel to the axis A—A, the clamping force exerted on the pipe-flanges can be considerable. The operation involved in effecting the standard replacement of one coupling unit by another unit having a different function can therefore be performed in a very short time.

As will be understood, other quick-clamping devices could be provided at the ends of the tie-bolts 4 without thereby departing from the scope of this patent of addition.

It is apparent that the invention is not limited to the particular embodiments which have been described in the foregoing and that the coupling may be provided with different internal arrangements. Thus, in the versions of the coupling which comprise a radial duct, the duct can be employed for the purpose of mounting therein a cock or like drawing-off means, or alternatively a branch pipe for the purpose of admitting into the main pipe another fluid under pressure (whether a liquid or a gas), thereby permitting the possibility in certain cases of effecting injections or mixtures.

In all cases, the replacement of one coupling by a different coupling of the set is carried out with great ease without entailing any need to remove the tie-bolts.

Similarly, it would not constitute a departure from the scope of the invention to form on the tie-bolts annular shoulders or collars having a length which is slightly shorter than that of the couplings so that the pipe elements may thus remain clamped together even in the event of removal of the coupling.

The mode of assembly of FIGS. 12 and 13 can be extended to form a coupling comprising, for example, three different coupling shells disposed in a triangle and adapted to perform different functions.

What is claimed is:

1. A multiple-purpose pipe-coupling system which is both demountable and convertible for the purpose of joining two elements of a same pipe comprising two oppositely facing flanges carried by said two pipe elements and coupled by means of tie bolts spaced about the axis of said pipe, wherein said pipe-coupling system comprises a tubular coupling removably inserted coaxially between the two pipe flanges and clamped therebetween while bearing longitudinally on two adjacent tie bolts, the relative spacing of two tie bolts whose axes are located on the side of the axis of the coupling system which is opposite to said two adjacent tie bolts being greater than the outside diameter of said coupling, said two opposite tie bolts being spaced from said coupling in the coaxial position of the coupling, the assembly of tie bolts being spaced around said coupling without passing therethrough, said coupling being part of a set of interchangeable couplings in the end faces of which are fitted annular seals which are adapted to project to a slight extent from said end faces in the rest position, the couplings of said set being provided with different internal elements so as to constitute different apparatuses which can be alternatively substituted for each other by being positioned between the pipe flanges, all the tie bolts having a quick-clamping manual control system, said quick-clamping manual control system comprising a plurality of eccentric profile cams each having an operating lever, said cams being pivoted each to one end of a said tie bolt and applied against the oppositely facing pipe flange, all said tie bolts being so disposed that different couplings of said set can be substituted for each other without the removal of any said tie bolt.

References Cited
UNITED STATES PATENTS

| | | | |
|---|---|---|---|
| 948,221 | 2/1910 | Hanson | 285—31 |
| 1,083,350 | 1/1914 | Davis | 277—178 X |
| 1,493,269 | 5/1924 | Kruesi | 285—363 X |
| 2,462,493 | 2/1949 | Hamer | 285—368 X |
| 2,635,643 | 4/1953 | Hamer | 285—363X |
| 2,786,696 | 3/1957 | Feldmeier | 285—93 X |
| 2,740,423 | 4/1956 | Stillwagon | 137—454.2 |
| 2,994,342 | 8/1961 | Stillwagon | 285—325 X |

FOREIGN PATENTS

| | | |
|---|---|---|
| 1,219,291 | 12/1959 | France. |
| 1,042,317 | 10/1958 | Germany. |

THOMAS F. CALLAGHAN, Primary Examiner

U.S. Cl. X.R.

137—454.2, 533.11, 559; 138—94.3; 210—448; 285—93, 312, 363